(12) United States Patent
Bertram et al.

(10) Patent No.: US 10,048,825 B2
(45) Date of Patent: *Aug. 14, 2018

(54) LINKING TAG SELECTIONS ACROSS MULTIPLE DASHBOARDS

(71) Applicant: International Business Machines Corporation, Armonk, NY (US)

(72) Inventors: Randal L. Bertram, Raleigh, NC (US); Gregory R. Hintermeister, Rochester, MN (US); Anthony D. Mora, Rochester, MN (US); Nicole X. Xie, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 571 days.

This patent is subject to a terminal disclaimer.

(21) Appl. No.: 14/572,868

(22) Filed: Dec. 17, 2014

(65) Prior Publication Data

US 2016/0170610 A1    Jun. 16, 2016

Related U.S. Application Data

(63) Continuation of application No. 14/569,824, filed on Dec. 15, 2014.

(51) Int. Cl.
 *G06F 3/0481* (2013.01)
 *G06F 3/0482* (2013.01)
 (Continued)

(52) U.S. Cl.
 CPC ............ *G06F 3/0481* (2013.01); *G06F 9/451* (2018.02); *G06F 17/30398* (2013.01);
 (Continued)

(58) Field of Classification Search
 CPC ............ G06F 3/04817; G06F 3/04842; G06F 9/4443; G06F 17/30023; G06F 17/3005; G06F 17/30398; G06F 9/451
 See application file for complete search history.

(56) References Cited

U.S. PATENT DOCUMENTS 6,279,016 B1 * 8/2001 De Vorchik ...... G06F 17/30395
                                                                707/999.004
6,995,768 B2 * 2/2006 Jou .......................... G06F 9/542
                                                                345/440

(Continued)

OTHER PUBLICATIONS

Dalgleish, D., "Filter Multiple Pivot Tables with Excel 2010 Slicers," http://blog.contextures.com/archives/2011/03/07/filter-multiple-pivot-tab . . . (last modified Mar. 7, 2011; last accessed Oct. 13, 2014 3:57 PM).

(Continued)

*Primary Examiner* — Eric J Bycer
(74) *Attorney, Agent, or Firm* — Nicholas D. Bowman

(57) ABSTRACT

A first data visualization based on first and second sets of data items is provided on a first dashboard. A second data visualization based on third and fourth sets of data items is provided on a second dashboard. Each data item of the first and third sets has at least a first tag. Each data item of the second and fourth sets does not have the first tag. A selection of the first tag is received. In response to the selection, a third data visualization based on the first set of data items and not based on the second set of data items is provided in place of the first data visualization and a fourth data visualization based on the third set of data items and not based on the fourth set of data items is provided in place of the second data visualization.

6 Claims, 10 Drawing Sheets

(51) Int. Cl.
*G06F 9/451* (2018.01)
*G06F 17/30* (2006.01)
*G06Q 10/08* (2012.01)
*G06Q 50/28* (2012.01)

(52) U.S. Cl.
CPC .. *G06F 17/30554* (2013.01); *G06F 17/30572* (2013.01); *G06F 17/30991* (2013.01); *G06F 17/30997* (2013.01); *G06Q 10/08* (2013.01); *G06Q 50/28* (2013.01); *G06F 3/0482* (2013.01); *G06F 3/04817* (2013.01); *G06F 17/3005* (2013.01); *G06F 17/30023* (2013.01)

(56) References Cited

U.S. PATENT DOCUMENTS

| | | | |
|---|---|---|---|
| 8,291,330 | B2 | 10/2012 | Branson et al. |
| 8,711,148 | B2 | 4/2014 | Breeds et al. |
| 8,719,243 | B2 | 5/2014 | Tobin et al. |
| 2006/0294098 | A1* | 12/2006 | Thomson ......... G06F 17/30539 |
| 2007/0239746 | A1* | 10/2007 | Masselle ............ G06F 17/3089 |
| 2008/0127052 | A1* | 5/2008 | Rostoker ............... G06Q 30/02 717/105 |
| 2008/0256443 | A1* | 10/2008 | Li ....................... G06F 3/0486 715/700 |
| 2009/0006319 | A1* | 1/2009 | Lehtipalo .......... G06F 17/30572 |
| 2009/0265631 | A1* | 10/2009 | Sigurbjornsson ...... G06Q 10/10 715/716 |
| 2009/0322756 | A1* | 12/2009 | Robertson ......... G06F 17/30716 345/440 |
| 2010/0287135 | A1* | 11/2010 | Bruland ........... G06F 17/30592 707/600 |
| 2012/0173553 | A1* | 7/2012 | Johansson ........... G06F 17/3089 707/754 |
| 2014/0033079 | A1 | 1/2014 | Sage et al. |
| 2014/0059069 | A1 | 2/2014 | Taft et al. |
| 2014/0280062 | A1* | 9/2014 | Augustin .......... G06F 17/30991 707/722 |
| 2016/0092530 | A1* | 3/2016 | Jakubiak ........... G06F 17/30572 715/202 |

OTHER PUBLICATIONS

Mell, P. et al., "The NIST Definition of Cloud Computing," Recommendations of the National Institute of Standards and Technology, U.S. Department of Commerce, Special Publication 800-145, 7 pgs., Sep. 2011.
"VMware vCenter Operations Manager Getting Started Guide," Customer User Interface, vCenter Operations Manager 5.7.1, EN-000929-01.
"Yet Another DataTables col. Filter (Yadcf) 0.8.5.beta.1 Multiple tables example," http://yadcf-showcase.appspot.com/multiple_tables.html (last accessed Oct. 13, 2014 3:55 PM).
Bertam et al., "Linking Tag Selections Across Multiple Dashboards," U.S. Appl. No. 14/569,824, filed Dec. 15, 2014.
IBM, "List of IBM Patents or Patent Applications Treated as Related."

* cited by examiner

| Customer Name | Previous Day's Rye Order | Previous Day's Wheat Order | Previous Day's White Order | Location | ETA of Delivery to Customer | Tags |
|---|---|---|---|---|---|---|
| Customer A | $300 | $300 | $300 | Irvine, CA | 25 minutes | West Coast Region |
| Customer B | $100 | $100 | $100 | Seattle, WA | 40 minutes | West Coast Region |
| Customer C | $100 | $200 | $200 | New York, NY | Delivered | East Coast Region |
| Customer D | $200 | $400 | $100 | Gary, IN | 10 minutes | Midwest Region |
| Customer E | $100 | $100 | $100 | Portland, Oregon | Delivered | West Coast Region |
| Customer F | $100 | $300 | $100 | Grand Rapids, MI | 65 minutes | Midwest Region |
| Customer G | $100 | $300 | $100 | Boston, MA | Delivered | East Coast Region |
| Customer H | $100 | $500 | $100 | Chicago, IL | 75 minutes | Midwest Region |

LINKING TAG SELECTIONS ACROSS MULTIPLE DASHBOARDS

BACKGROUND

The present disclosure relates to data processing, and more specifically, to linking tag selections across multiple dashboards displayed to a user.

Dashboards are used for monitoring information in many different industries and settings. As used herein, a dashboard may refer to a digital display that is designed to show data about a particular topic of interest to a computer user. A dashboard may be limited to a single page. It may include a graphical presentation of the current status and historical trends relating to metrics or performance indicators associated with the particular topic of interest.

In some configurations, dashboards may include data visualizations (e.g., summaries, charts, graphs, tables, and infographics) that are generated by widgets associated with the dashboards. As used herein, a widget may refer to a simple application or application component that is designed to output a limited set of types of data visualizations based on data inputs. The type of data inputs that a given widget can accept may be limited to a narrow topic. In some configurations, each data visualization in a particular dashboard may be situated in its own sub-view or pane within the dashboard.

SUMMARY

According to embodiments of the present disclosure, aspects of the disclosure may include a method, a system, and a computer program product for managing a plurality of dashboards. A first data visualization is provided on a first dashboard of the plurality of dashboards. The first data visualization is based on a first set of data items and a second set of data items. Each data item of the first set of data items has at least a first tag. Each data item of the second set of data items does not have the first tag. A second data visualization is provided on a second dashboard of the plurality of dashboards. The second data visualization is based on a third set of data items and a fourth set of data items. Each data item of the third set of data items has at least the first tag. Each data item of the fourth set of data items does not have the first tag. A selection of the first tag is received. In response to the selection, a third data visualization is provided in place of the first data visualization. The third data visualization is based on the first set of data items and not based on the second set of data items. Also in response to the selection, a fourth data visualization is provided in place of the second data visualization. The fourth data visualization is based on the third set of data items and not based on the fourth set of data items.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of some embodiments and do not limit the disclosure.

FIG. 3 illustrates a diagram of an example database table having tagged data items, in accordance with embodiments of the present disclosure.

Figure 1A:
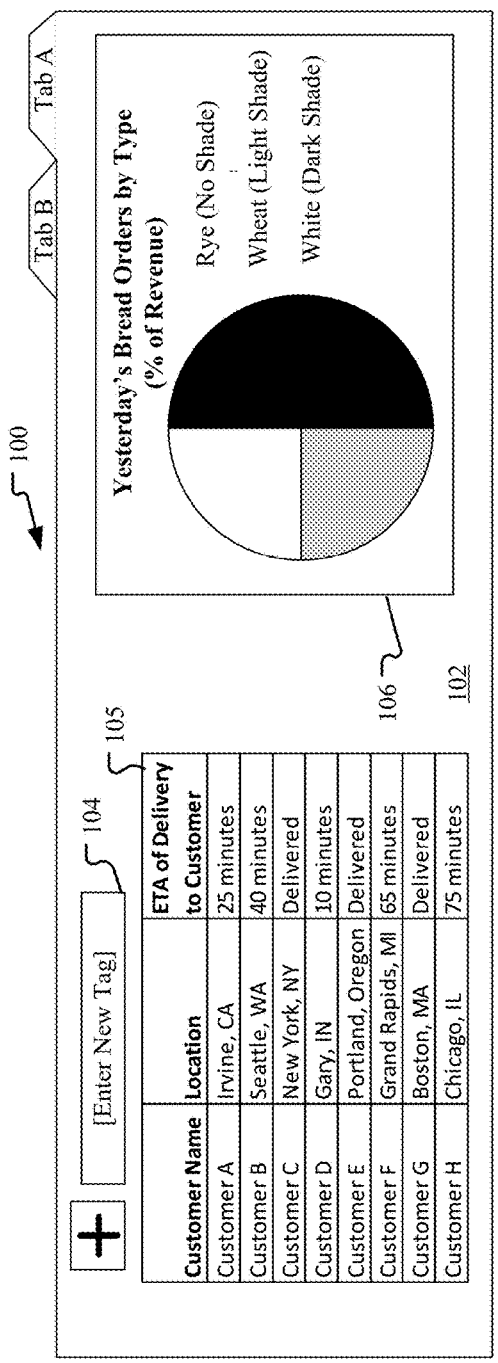
FIGS. 1A and 1B illustrate two views of a graphical user interface (GUI) display, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to data processing, and more specifically, to linking tag selections across multiple dashboards displayed to a user. While the present disclosure is not necessarily limited to such applications, various aspects of the disclosure may be appreciated through a discussion of various examples using this context.

In some embodiments, the data used (e.g., processed) to generate data visualizations on dashboards may be organized into data items. As used herein, a data item may refer to a small collection of related data (e.g., a piece of information). These data items may have (e.g., be tagged with) one or more tags. As used herein, a tag may refer to a keyword or term that can be assigned to a data item. A tag may be metadata that helps describe or classify the data item to which it is attached. In some embodiments, tags may be non-hierarchical, with each tag being independent of other tags. Tags may be useful in filtering, compiling, or sorting data items used to generate data visualizations. For example, a more specific data visualization could be generated in place of an original data visualization by limiting the data items used to generate the more specific data visualization to only data items having a particular tag.

In some situations it may be necessary or helpful for a computer to provide a user more than one dashboard at a time. This may occur when the user wants to see visuals about multiple facets of a single topic. For example, a librarian might want to use one dashboard that shows graphics about the current status of the library's collection of books (e.g., number of books in the collection, percent of books checked out) and also might want to use a second dashboard that shows tables about the usage of the library's vending machines (e.g., how often each vending machine is used).

While it may not be possible or desirable to have all of the relevant data visualizations displayed in a single dashboard, it may be equally undesirable to have multiple dashboards that are not linked. This may be especially true in situations where data is organized into data items having tags. For example, if two dashboards are not linked, then limiting both dashboards to include information about data items having a particular tag may require the independent selection of that tag in both dashboards. This may be cumbersome. Instead, in some embodiments, two or more dashboards may be linked together whereby a single tag selection made by a user may modify both dashboards accordingly. This may result in the ability to simultaneously filter multiple dashboards as desired by the user. In some embodiments, the two or more dashboards may be on the same or different pages (e.g., different webpages) and may be displayed in the same or different views.

Figure 1B:
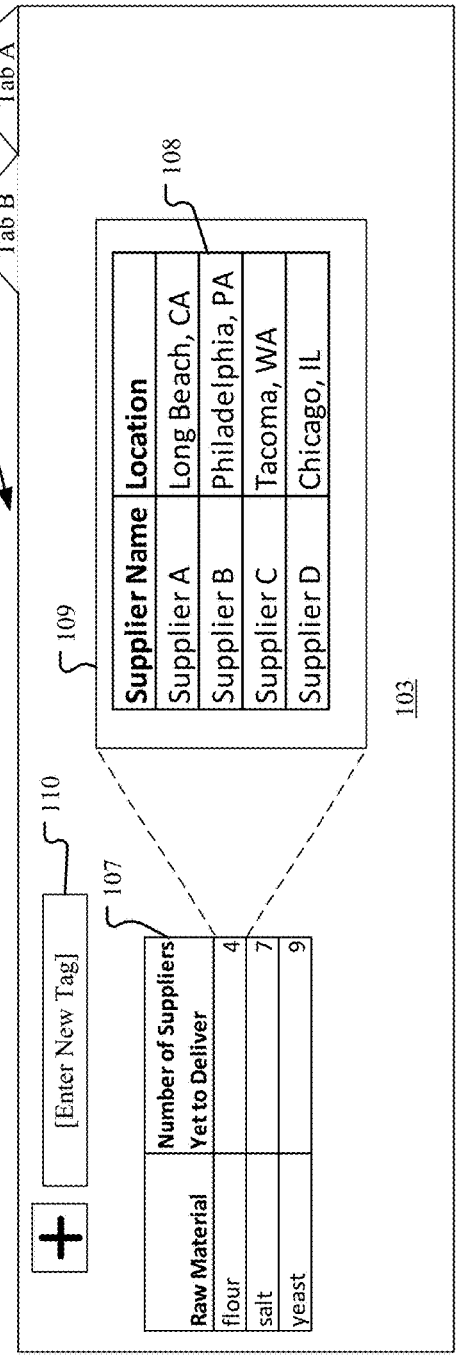

Referring now to FIGS. 1A and 1B, shown are two views of a graphical user interface (GUI) display 100, in accordance with embodiments of the present disclosure. As depicted, GUI display 100 includes two dashboards, 102 and 103, that are used by a general manager of an example commercial bread maker to monitor the status of the company's bread sales and production. More specifically, dashboard 102, which includes tab A and is shown in the forefront in FIG. 1A, is used by the general manager to monitor the company's bread sales. This is contrasted with dashboard 103, which includes tab B and is shown in the forefront in FIG. 1B. Dashboard 103 is used by the general manager to monitor the company's bread production. By clicking on the tabs, the general manager is able to switch between the dashboards on the monitor (e.g., touchscreen) of his electronic device (e.g., laptop, tablet computer). In some embodiments, the manager may also be able to display both dashboards 102 and 103 on his monitor at the same time. For example, he may be able to resize both dashboards 102 and 103 so that they can be seen on the screen at the same (e.g., in a side-by-side manner). Further, in some embodiments, dashboards 102 and 103 may be products or parts of products (e.g., programs, applications) that are offered by the same or different technology companies. The dashboards may or may not have been intended to be used together at the time they were developed.

Referring now to FIG. 1A specifically, included in dashboard 102 is a first data visualization 105, a second data visualization 106, and first tag selector tool 104. In this example, the first data visualization 105 is a table showing the status of deliveries of the day's bread orders to the company's eight largest customers (Customers A-H). Included in the table of data visualization 105 is the name of each customer, the location of each customer, and the estimated time of arrival (ETA) of the day's bread deliveries to each customer. The delivery ETAs may be continuously or periodically updated until delivery is completed and "Delivered" is shown in the appropriate table cell. In some embodiments, the first data visualization 105 may be generated and updated by a first widget (not shown) linked to the dashboard 102. Further, the widget may be able to provide the first data visualization 105 by obtaining the necessary data items from one of the company's databases and processing those data items. In order for the first data visualization 105 to be updated, these data items upon which the first visualization 105 is based may likewise need to be updated. Updated data items (e.g., new delivery ETAs) may be provided by using remote inputs or data sensors. For instance, in the depicted example, GPS devices on the company's delivery trucks may provide the delivery information to the database based on the routes driven by the delivery trucks.

Also included in the dashboard 102 and shown in FIG. 1A is the second data visualization 106. In this example, the second data visualization 106 includes a pie graph representing the company's bread orders by type for the previous day. In this example, the general manager can learn from the second data visualization 106 that the company's revenue from the previous day was about fifty percent from white bread, twenty-five percent from rye bread, and twenty-five percent from whole wheat bread. In some embodiments, the second data visualization 106 may be generated and updated (e.g., daily) by a second widget (not shown) that (like the first widget) is linked to the dashboard 102. Likewise, the second widget may be able to obtain the necessary data items for the second data visualization 106 from one of the company's databases. This may be the same or different database from the one used by the first widget to generate the first data visualization 105.

Also included in the dashboard 102 and shown in FIG. 1A is the first tag selector tool 104. In some embodiments, a tag selector tool may include any device configured to receive new tag selections, for example, from a user of the dashboard. In this example, the first tag selector tool 104 includes a text box for typing in one or more new tags and a button for entering each tag selection once it is typed. More specifically, if the general manager determines that he wants to limit the data items that he is referencing (i.e., the general manager wants to replace the first data visualization 105 and the second data visualization 106 with new data visualizations), the general manger can select a specific tag and enter it into the tag selector tool 104. As described herein, tag selector tool 104 may also be linked to dashboard 103. By linking a tag selector tool across two or more dashboards, a tag selection in one tag selector tool may be driven down to any linked dashboard and all of the linked dashboards may be simultaneously and dynamically updated.

Referring now to FIG. 1B specifically, included in dashboard 103 is a third data visualization 107 and a second tag selector tool 110. As shown, the third data visualization 107 is associated with a drilldown 109 that includes a fourth data visualization 108. As used herein, a drilldown may include a data visualization that contains more detailed information about a specific portion of another data visualization to which the drilldown is linked. In some embodiments, the drilldown may be accessed (e.g., displayed in a pop-up window) when the specific portion is selected (e.g., clicked) by a user. In this example, the third data visualization is a table that shows the general manager the number of suppliers that have not yet delivered each of the day's bread production raw materials (flour, salt, and yeast). Each of the numbers (4, 7, and 9) included in the third data visualization 107 may be configured to be clickable by the general manager, so that when any given number is clicked by the general manager, a drilldown including more detailed information about that number appears on the general manager's screen. In the depicted example, the general manager clicks on the number "4" and drilldown 109, which includes the fourth data visualization 108, is displayed to the general manager. From the fourth data visualization 108, the general manager can learn the names and locations of all four of the suppliers that have not yet delivered the day's supply of flour to the company. In some embodiments, the third data visualization 107 and the fourth data visualization 108 may be generated by the same widget (or different widgets), which widget may be linked to the second dashboard 103. Further, in some embodiments, the widget (not shown) that generates data visualizations 107 and 108 may obtain the data items upon which these data visualizations are based from one of the company's databases or from a remote source. These data items may be updated, automatically or manually, each time another supplier delivers raw materials. The updated data items may then be used by the widget to provide updates to both data visualizations 107 and 108. For example, if supplier A where to deliver flour, the number of suppliers yet to deliver would drop to three in the third data visualization 107 and supplier A would no longer be included in the fourth data visualization 108.

Figure 2A:
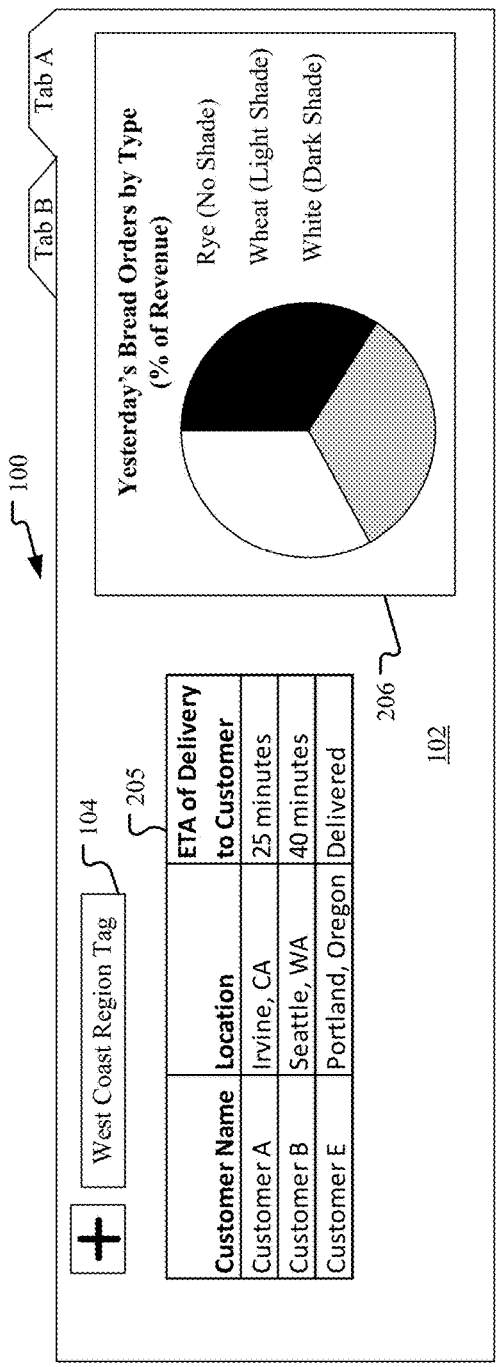
FIGS. 2A and 2B illustrate new versions of the two views of the GUI display shown in FIGS. 1A and 1B, in accordance with embodiments of the present disclosure.
Figure 2B:
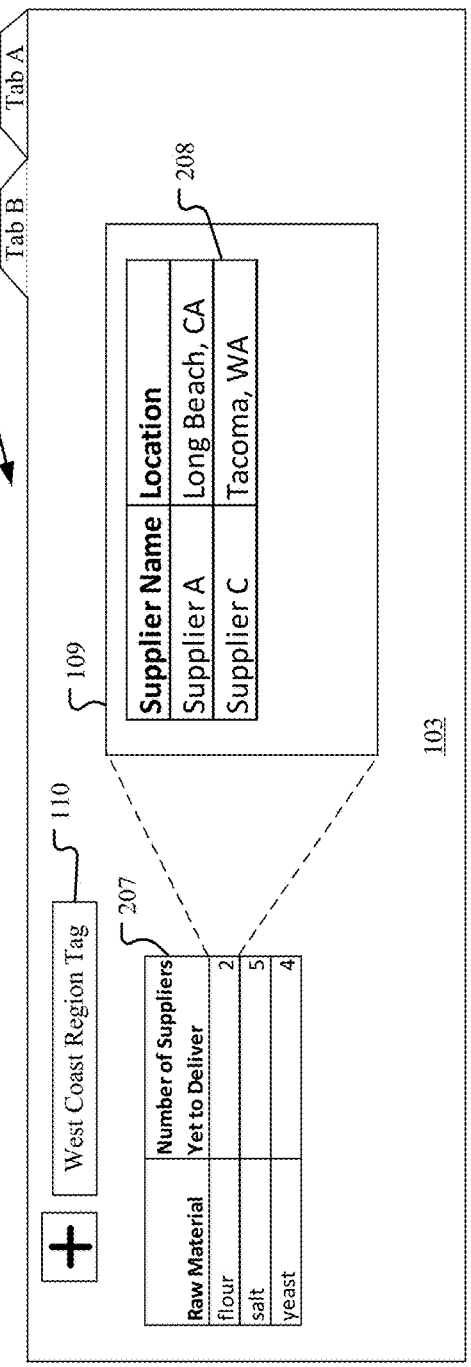

Referring now to FIGS. 2A and 2B, shown are new versions of the two views of the GUI display 100 shown in FIGS. 1A and 1B, in accordance with embodiments of the present disclosure. In this example, the general manager has selected the west coast region tag using one of the two tag selectors 104 or 110. As shown, the GUI display 100 still includes dashboards 102 and 103. However, the data visualizations shown in FIGS. 1A and 1B have been replaced in response to this tag selection. Specifically, on dashboard 102, fifth data visualization 205 is provided in place of first data visualization 105 and sixth data visualization 206 is provided in place of the second data visualization 106. Likewise, on dashboard 103, seventh data visualization 207 is provided in place of the third data visualization 107 and, in drill down 109, eighth data visualization 208 is provide in place of the fourth data visualization 108.

In the depicted example, each original data visualization 105-108 is the same as its replacement data visualization 205-208 (in terms of display type, location on dashboard, etc.) except that the replacement data visualizations 205-208 are based only on data items having the west coast region tag. For example, while data visualization 105 is based on data items relating to all of the customers A-H, data visualization 205 is based only on data items about customers in the west coast region (as represented by having the appropriate tag). Furthermore, in the depicted example, both tag selector tools 104 and 110 are updated in response to the tag selection, so they both indicate that the west coast region tag has been selected.

Referring now to FIG. 3, shown is a diagram of an example database table 301 having tagged data items 311-318, in accordance with embodiments of the present disclosure. Database table 301 may be included in a database (not shown) and arranged therein in any appropriate manner. As shown, database table 301 includes example data items upon which the data visualizations shown in dashboard 102 (including the first data visualization 105 and second data visualization 106 shown in FIG. 1A and fifth data visualization 205 and sixth data visualization 206 shown in FIG. 2A) are based. As shown, database table 301 includes data items 311-318, which are arranged such that each data item is represented in a separate row in the database table 301 (with each data item spanning all of the cells of its respective row). Included in column 327 are the tags for each data item. For example, data item 311 has been labeled with the west coast region tag.

In this example, all eight data items 311-318 are used to generate the two data visualizations 105 and 106 in FIG. 1A. More specifically, first data visualization 105 is generated based on the data in the appropriate cells in columns 321, 325, and 326 for all eight data items 311-318. Also, second data visualization 106 is generated based on the data in the appropriate cells in columns 322, 323, and 324 for all eight data items 311-318. For example, in the second data visualization 106, the percent of the previous day's orders that were rye is calculated based on adding up all of the values in column 322 (previous day's rye orders) and dividing that number by the total value of all of the previous day's bread orders (i.e., the sum of all of the values in columns 322, 323, and 324). Once the percent of rye orders is calculated, it is used to generate the appropriate portion of the pie graph of data visualization 106 (in this instance a quarter of the pie graph).

To continue this example, the selection of the west coast region tag by the company's general manager causes the data items not having that particular tag to be filtered out of the database table 301 for the purpose of generating the fifth data visualization 205 and sixth data visualization 206 of FIG. 2A. In this instance, only data in the three data items 311, 312, and 315 are used to generate the two data visualizations 205 and 206. More specifically, fifth data visualization 205 is generated based on the data in the appropriate cells in columns 321, 325, and 326 for the three data items 311, 312, and 315. Also, sixth data visualization 206 is generated based on the data in the appropriate cells in columns 322, 323, and 324 for the three data items 311, 312, and 315.

Figure 4:
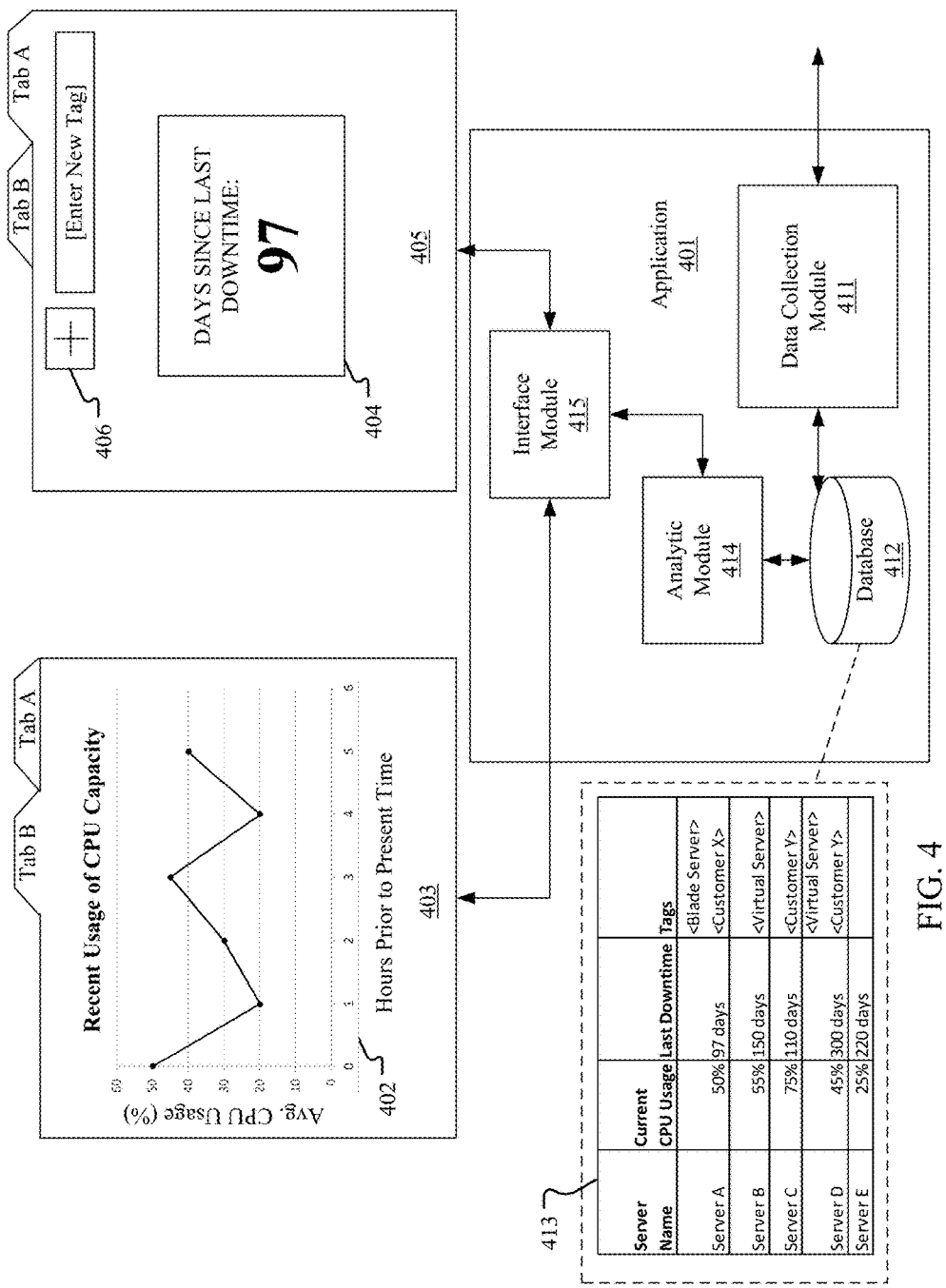
FIG. 4 illustrates a diagram of an application generating a first data visualization for use in a first dashboard and a second data visualization for use in a second dashboard, in accordance with embodiments of the present disclosure.

Referring now to FIG. 4, shown is a diagram of an application 401 generating a first data visualization 402 for use in a first dashboard 403 and a second data visualization 404 for use in a second dashboard 405, in accordance with embodiments of the present disclosure. In this example, application 401 is configured to provide a system administrator of a technology company with a first dashboard 403 including a continuously updated line graph (data visualization 402) showing the average usage of CPU capacity in the company's servers (servers A-E) over the last five hours. Further, in this example, application 401 is also configured to provide the system administrator with a second dashboard 405 including a numerical display (data visualization 404) of the last time any of the company's servers went down.

As shown, application 401 includes, in some embodiments, a data collection module 411, a database 412, an analytic module 414, and an interface module 415. In use, the data collection module 411 may be configured to collect relevant data (either full data items or portions thereof) and provide the data to database 412. Analytic module 414 may be configured to obtain data items from database 412 and use those data items to generate data visualizations 402 and 404, including any necessary updates thereto. The interface module 415 may be configured to display the data visualizations 402 and 404, as well as their updates, on the first dashboard 403 and the second dashboard 405, respectively. The interface module 415 may also serve to respond to the input of a new tag selection in the tag selector tool 406. In some embodiments, tag selector tool 406 may not be located within either dashboard 403 or 405, but rather may be in its own separate display or separate view altogether.

Also, shown in a call out box in FIG. 4 is a portion 413 of the data stored in database 412. In the depicted example, the portion 413 includes five data items (corresponding to the five servers A-E). In an example use of application 401, the data collection module 411 collects new data about the company's servers. This data is stored in database 412 and is used to update the portion 413. The analytic module 414 obtains the updated data from portion 413 and applies the updates as necessary in order to update first data visualization 402 and second data visualization 404. The updates are passed to the interface module 415 which provides the updates to the first dashboard 403 and the second dashboard 405. More specifically, in this example, the first data visualization 402 is updated so that it displays at a new point in the line graph which represents the fact that the average CPU usage of the five servers at the current time (i.e., zero hours prior to the present time) is fifty percent (i.e., the average of current CPU usage by all five servers A-E is fifty percent). Further, in this example, no updates may be needed to data visualization 404 because the days since last down time (in this instance, since server A went down) remains at ninety seven days.

Figure 5:
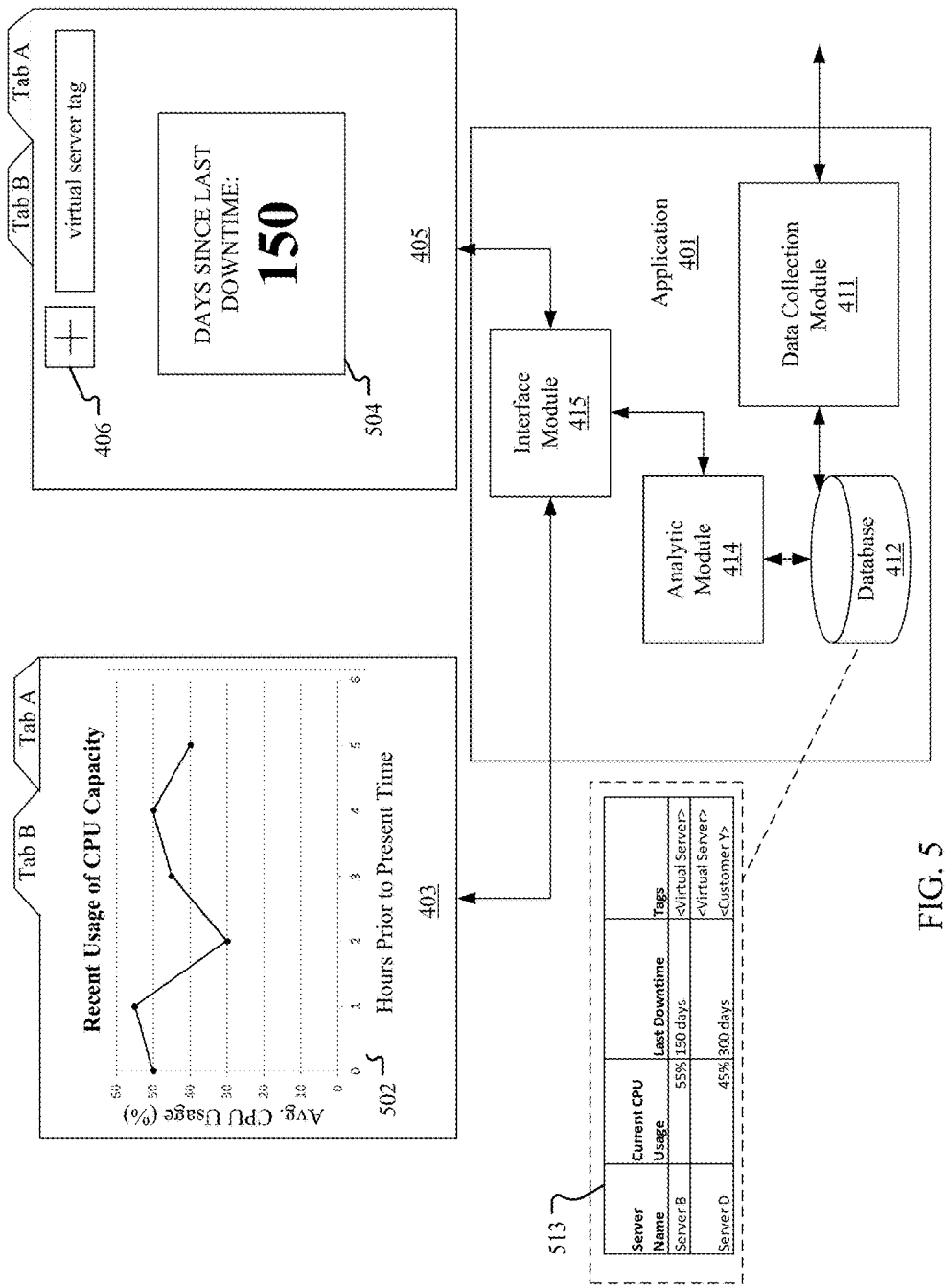
FIG. 5 illustrates the application of FIG. 4 generating, in response to a tag selection, a third data visualization in place of the first data visualization for use in the first dashboard and a fourth data visualization in place of the second data visualization for use in the second dashboard, in accordance with embodiments of the present disclosure.

Referring now to FIG. 5, shown is the application 401 of FIG. 4 generating, in response to a tag selection, a third data visualization 502 in place of the first data visualization 402 for use in the first dashboard 403 and a fourth data visualization 504 in place of the second data visualization 404 for use in the second dashboard 405, in accordance with embodiments of the present disclosure. In this example, the system administrator has determined that he wants to know more information about his company's virtual servers. He enters the tag of "virtual server" in the tag selector tool 406. In response to the new tag selection, the analytic module 414 filters out data items from the database 412 in order to create a new data portion 513. As shown, the new portion 513 includes only data items that include the virtual server tag, which, in this example, includes the data item associated with server B and the data item associated with server D. Based on the portion 513, the analytic module 414 generates the new third data visualization 502 to replace the old first data visualization 402. Likewise, also based on the new portion 513, the analytic module 414 generates the new fourth data visualization 504 to replace the old second data visualization 404. Rather than being based on all five data items like the old data visualizations 402 and 404, the new data visualizations 502 and 504 are only based on two of the five data items. As a result, the third data visualization 502 shows a different line shape within its line graph than is shown in the line graph of the first data visualization 402. Also, the days since last downtime shown in fourth data visualization 504 is one-hundred-fifty days (based on when server B was last down) rather than the ninety-seven days shown in the second data visualization 404.

While in reference to FIGS. 4 and 5, the ordering of the displaying of the data visualizations is described as going from data visualizations 402 and 404 to data visualizations 502 and 504 in response to the selection of a single tag, it is contemplated that, in some embodiments, tags may also be removed in order to obtain new data visualizations. For example, the virtual server tag shown in FIG. 5 could be removed by the system administrator and the data items not having the virtual server tag could be added back in (e.g., the filtering could be modified so that these other data items are included) and, as a result, the data visualizations 502 and 504 could be replaced by data visualization 402 and 404.

Furthermore, in some embodiments, multiple tags could be employed at the same time. For example, in reference to FIG. 4, if the tags of "virtual server" and "customer Y" were both selected by the user, then new data visualizations could be generated by the analytic module 414 to replace data visualizations 402 and 404. These new data visualizations could be based on only the data item relating to server D (if the system is configured to treat the selection of two tags as a request to filter down to only those data items having both tags), or, in the alternative, the new data visualizations could be based on the data items relating to servers B, C, and D (if the system is configured to treat the selection of two tags as a request to filter down to those data items having one or both of the tags).

Figure 6:
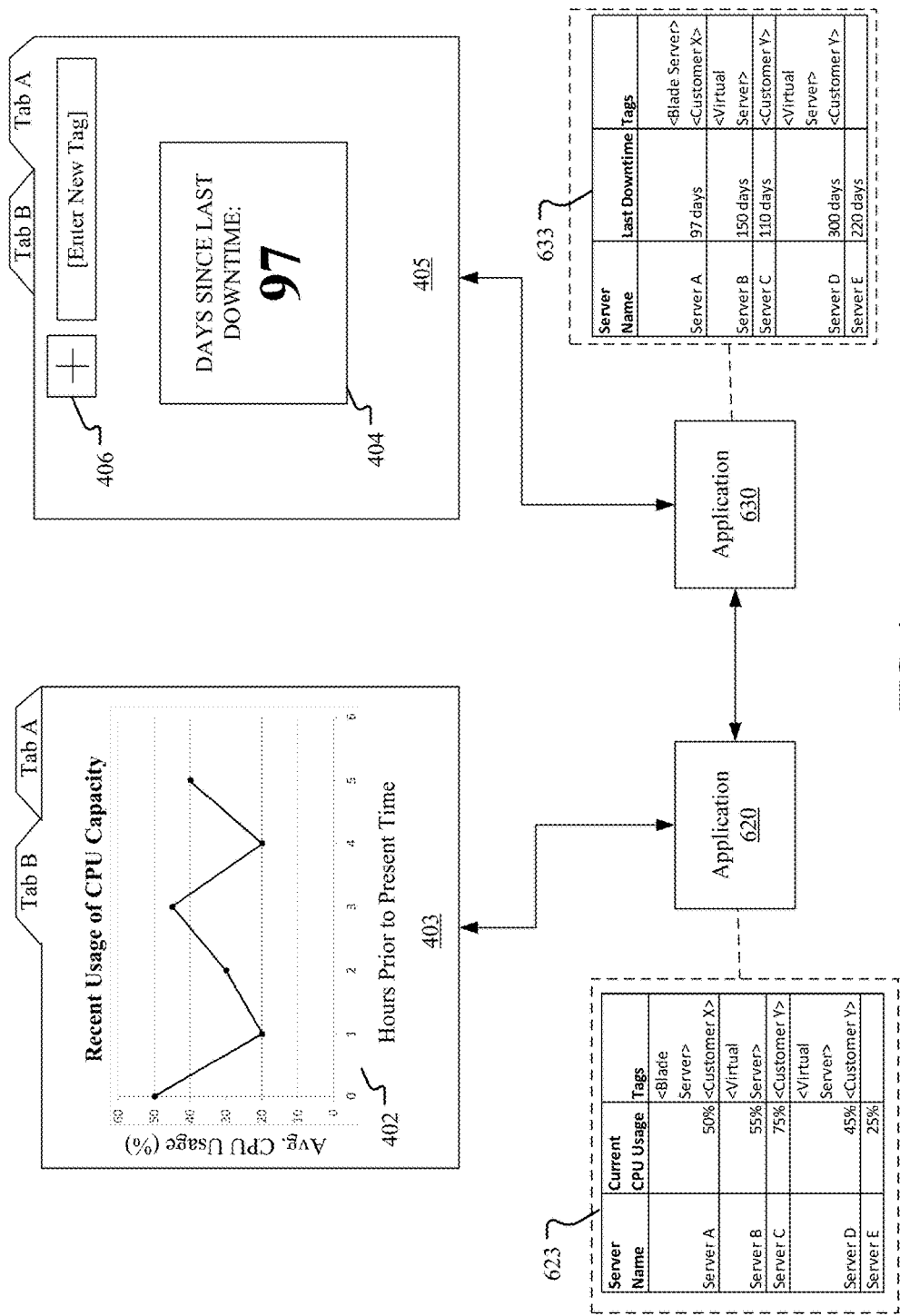
FIG. 6 illustrates the data visualizations of FIG. 4 being generated by two applications, rather than by one application, in accordance with embodiments of the present disclosure.

Referring now to FIG. 6, shown are data visualizations 402 and 404 of FIG. 4 being generated by two applications 620 and 630, rather than by one application 401, in accordance with embodiments of the present disclosure. As shown, each of the applications 620 and 630 may be substantially similar to the application 401 of FIG. 4, except these applications may be configured to provide data visualization to only one dashboard each (e.g., with application 620 providing data visualizations on dashboard 403 and application 630 providing data visualizations on dashboard 405). In some embodiments, the data items relied upon by the applications 620 and 630 may be different from each other (e.g., they may come from different databases or they may come from the same database but be based on different data from that database). Specifically, as depicted, application 620 provides first data visualization 402 in dashboard 403 based on the data items shown in portion 623, and application 630 provides second data visualization 404 in dashboard 405 based on the data items shown in portion 633.

Figure 7:
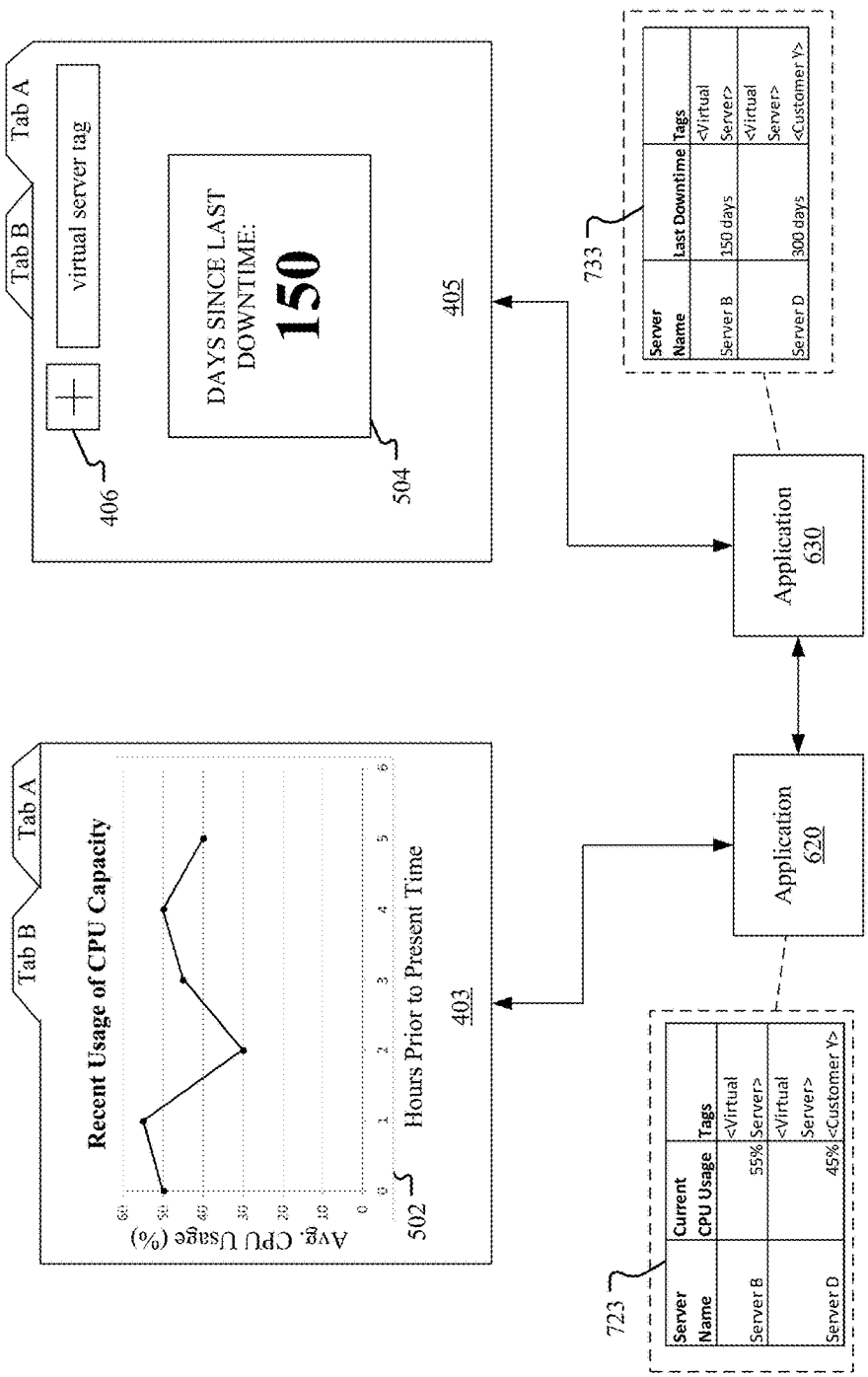
FIG. 7 illustrates the data visualizations of FIG. 5 being generated by two applications, rather than by one application, in accordance with embodiments of the present disclosure.

Referring now to FIG. 7, shown are data visualizations 502 and 504 of FIG. 5 being generated by two applications 620 and 630, rather than by one application 401, in accordance with embodiments of the present disclosure. In the depicted example, the scenario is the same as in FIG. 5 (with the system administrator selecting the virtual server tag using the tag selector tool 406), except the generating of the new data visualizations is performed by the two applications 620 and 630, rather than by application 401 alone. In this example, the selection of the tag causes the application 630 to notify the application 620 of the updated tag selection. The data portions 623 and 633 are then filtered by their respective applications 620 and 630 so that they are limited to only the data items having the virtual server tag, as is shown in data portions 723 and 733. Application 620 then provides data visualization 502 in place of data visualization 402 and application 630 provides data visualization 504 in place of data visualization 404.

Figure 8:
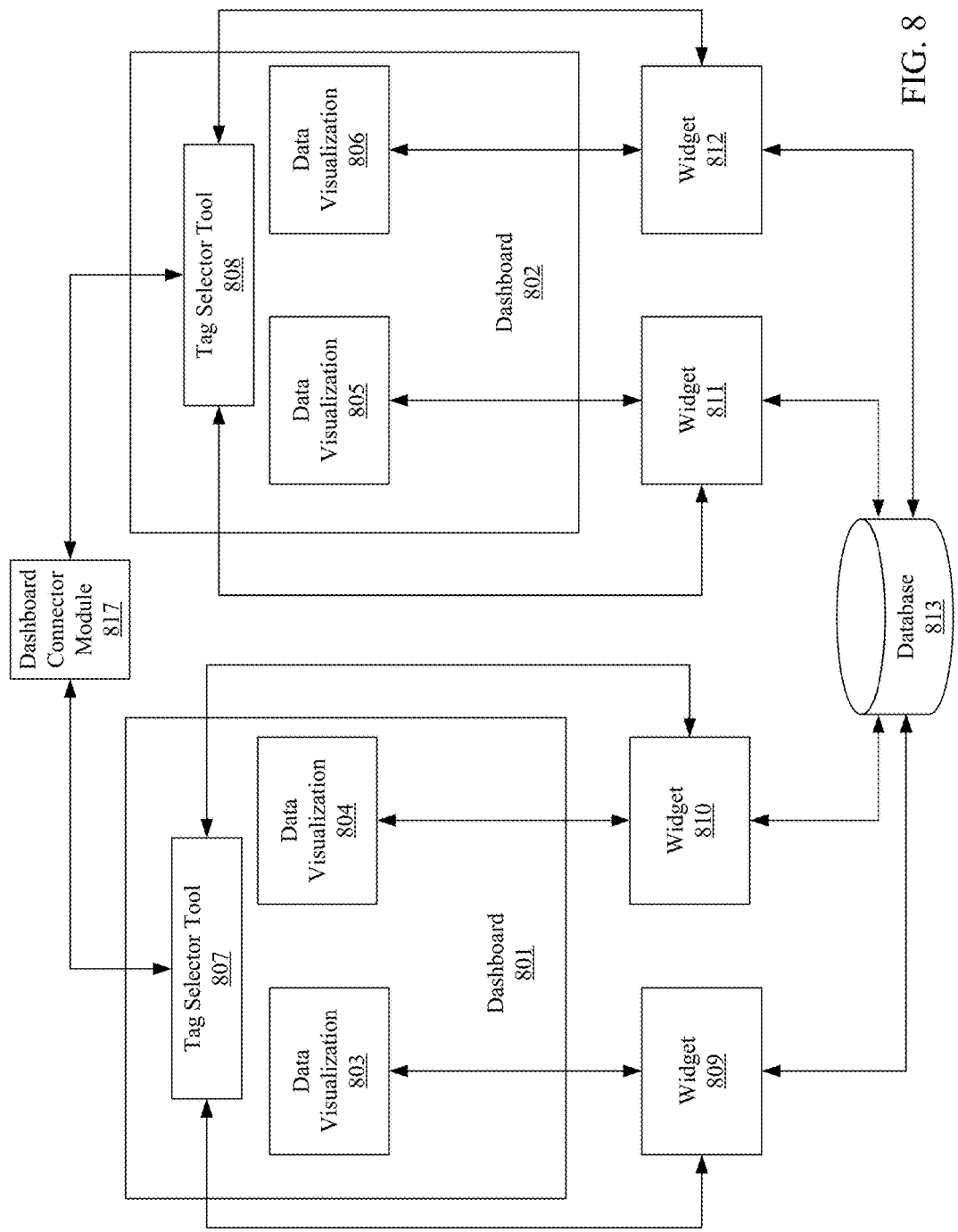
FIG. 8 illustrates a block diagram of two dashboards with four example data visualizations provided by four example widgets, in accordance with embodiments of the present disclosure.

Referring now to FIG. 8, shown is a diagram including two dashboards with four example data visualizations provided by four example widgets, in accordance with embodiments of the present disclosure. Included in dashboard 801 are two data visualizations 803 and 804 and a tag selector tool 807. The data visualizations 803 and 804 are generated by widgets 809 and 810, respectively, which obtain necessary data items (including updates) from database 813. In some embodiments, each widget 809 and 810 may have its own respective portion within database 813 from which it obtains the data items that it requires. Likewise, included in dashboard 802 are two data visualizations 805 and 806 and a tag selector tool 808. The data visualizations 805 and 806 are generated by widgets 811 and 812, respectively, which also obtain necessary data items (including updates) from database 813. In some embodiments, each of the widgets 809-812 may be substantially similar to one of the applications 620 or 630 of FIG. 6. Further, in some embodiments, each of the widgets 809-812 may generate the data visualizations 803-806, respectively, by processing the data items upon which that particular data visualization is based.

Also included in FIG. 8 is a dashboard connector module 817. In some embodiments, dashboard connector module 817 may be configured to serve as a link between tag selector tools 807 and 808. For example, in response to the selection of a tag in one of the tag selector tools, the dashboard connector module 817 may communicate the selection to the other tag selector tool, which may then be updated accordingly so as to display the same tag selection.

An example of the system of FIG. 8 in use is provided herein. In this example, widgets 809-812 originally provide data visualizations 803-806, respectively. Then a tag is selected by a user using tag selector tool 807 of dashboard 801. The tag selector tool 807 notifies the dashboard connector module 817, which notifies the tag selector tool 808 of the updated tag selection.

The tag selector tool 807 also notifies the widgets 809 and 810 of the new tag selection. In response, widgets 809 and 810 filter, based on the newly selected tag, the data items that they utilize. The data items in database 813 having the new tag are then used by the widgets 809 and 810 to generate and provide new data visualizations (not shown) in place of data visualizations 803 and 804. Similarly, the tag selector tool 808 notifies the widgets 811 and 812 of the new tag selection. In response, widgets 811 and 812 filter, based on the new tag, the data items that they utilize. The data items in database 813 having the new tag are then used by the widgets 811 and 812 to generate and provide new data visualizations (not shown) in place of data visualizations 805 and 806.

While four each of data visualizations and widgets; two each of dashboards and tag selector tools; and one each of dashboard connector module and database are shown in FIG. 8, it is contemplated that, in some embodiments, any number of any of these elements may be utilized. For example, in some embodiments, three or more dashboards may be used and may all be displayed to a user at the same time and may or may not have linked tag selector tools. For another example, in some embodiments, four databases may be used and each of the four widgets may only obtain data items from its own database. For yet another example, in some embodiments, the dashboard connector module may be eliminated and the tag selector tools may communicate more directly with each other.

Figure 9:
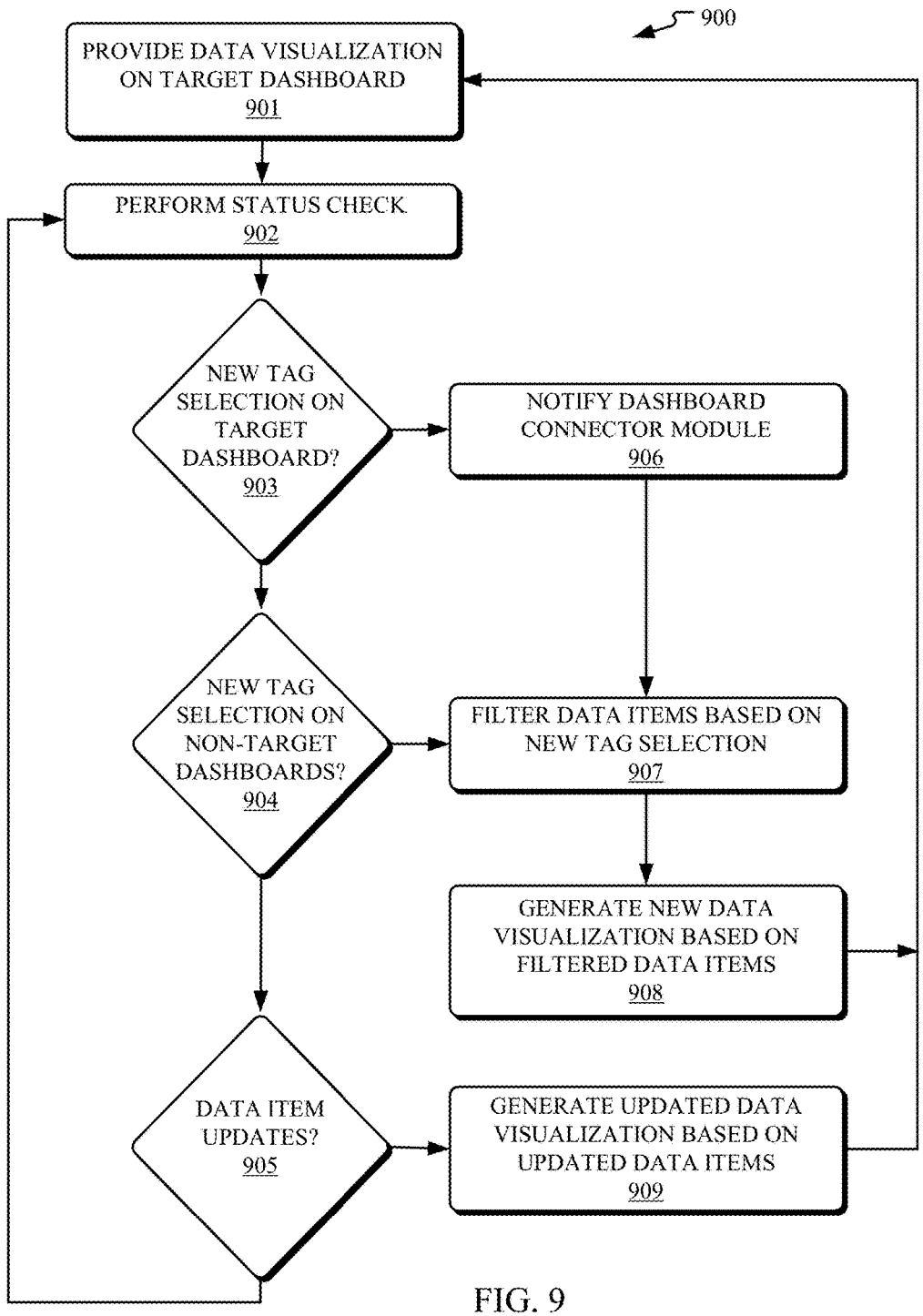
FIG. 9 illustrates a flowchart of an example method 900 for managing data visualizations on a target dashboard in a multiple dashboard system, in accordance with embodiments of the present disclosure.

Referring now to FIG. 9, shown is a flowchart of an example method 900 for managing data visualizations on a target dashboard in a multiple dashboard system, in accordance with embodiments of the present disclosure. In some embodiments, the method 900 may be performed by one or more widgets or other applications (or, more specifically, by one or computers, such as computer 1000 shown in FIG. 10, using the one or more widgets or other applications). The method may begin at operation 901, wherein the widget may provide a data visualization on the target dashboard included in the multiple dashboard system (or, more specifically, in some embodiments, the widget may generate the data visualization and provide it to a user's computer so the user's computer can provide it to the user by displaying it on the target dashboard via a monitor). Per operation 902, the widget may perform a status check to determine if any modifications are needed to the data visualization.

As part of the status check, per determination block 903, the widget may determine if a new tag selection has been made on the target dashboard (for example, via a tag selector tool on the target dashboard). If a determination is made that a new tag has been selected, then the widget may, per operation 906, provide notice of the updated tag selection to a dashboard connector module. By performing operation 906, the widget may provide a way for other tag selectors on other dashboards of the multiple dashboard system to be updated so that these other tag selectors are synchronized with the tag selector tool of the target dashboard. Per operation 907, the widget may filter the data items that it relies on based on the new tag selection. Per operation 908, the widget may generate a new data visualization based on the filtered data items. The widget may, per operation 901, provide the new data visualization on the target dashboard.

If, per determination block 903, a determination is made that a new tag has not been selected, then the widget may make another determination, per determination block 904, as to whether a new tag has been selected on a non-target dashboard of the multiple dashboard system. In some embodiments, a widget may perform determination 904 by receiving notices of new tag selections from the dashboard connector module. If, per determination block 904, a determination is made that a new tag has been selected on a non-target dashboard, then the widget may filter its data items (per operation 907), generate a new data visualization based on the filtered data items (per operation 908), and provide the new data visualization on the target dashboard (per operation 901).

If, per determination block 904, a determination is made that a new tag has not been selected on a non-target dashboard, then the widget may make a third determination, per determination block 905, as to whether any data items relevant to the widget have been updated. If so, then per operation 909, the widget may generate an updated data visualization based on the updated data items and, per operation 901, the updated data visualization may be provided on the target dashboard. If, however, in determination block 905, a determination is made that there are no data updates, then the widget may continue the cycle and begin another status check, per operation 902. In some embodiments, the cycling of method 900 may continue as the multiple dashboard system is utilized.

To aid understanding, another example scenario is provided. In this example, there are two system management applications. The first systems management application includes its own dashboard that has various table-driven data visualizations that show a number of details about the systems being managed. The second systems management application includes a dashboard that has graphical charts as data visualizations. These data visualizations show information about how efficiently resources (e.g., CPU, memory, hard disk) are being used by the set of systems being managed. Each of these two applications has its own set of standalone users and customers that prefer the individual function of the application they have chosen. However, there is another set of customers that really like to use both applications. Instead of merging the two applications fully, each application could be updated to allow linking to the other.

To continue the example, in some configurations, these two applications would be completely separate and when using both applications to analyze a similar set of systems the user would have to select the set of systems twice (once per application) with each selection being made with a different selection mechanism (e.g., a different tag selector tool). This might not be a streamlined process. Further, it may be difficult to confirm that the same set of systems is selected in both applications.

In some embodiments, the two systems management applications may be linked (e.g., via a dashboard connector module). Once linked, tags selected in one application can automatically be applied in the second application. This can help to ensure that the applications are matched up and the user who prefers using both applications together is provided an easily understandable display.

Figure 10:
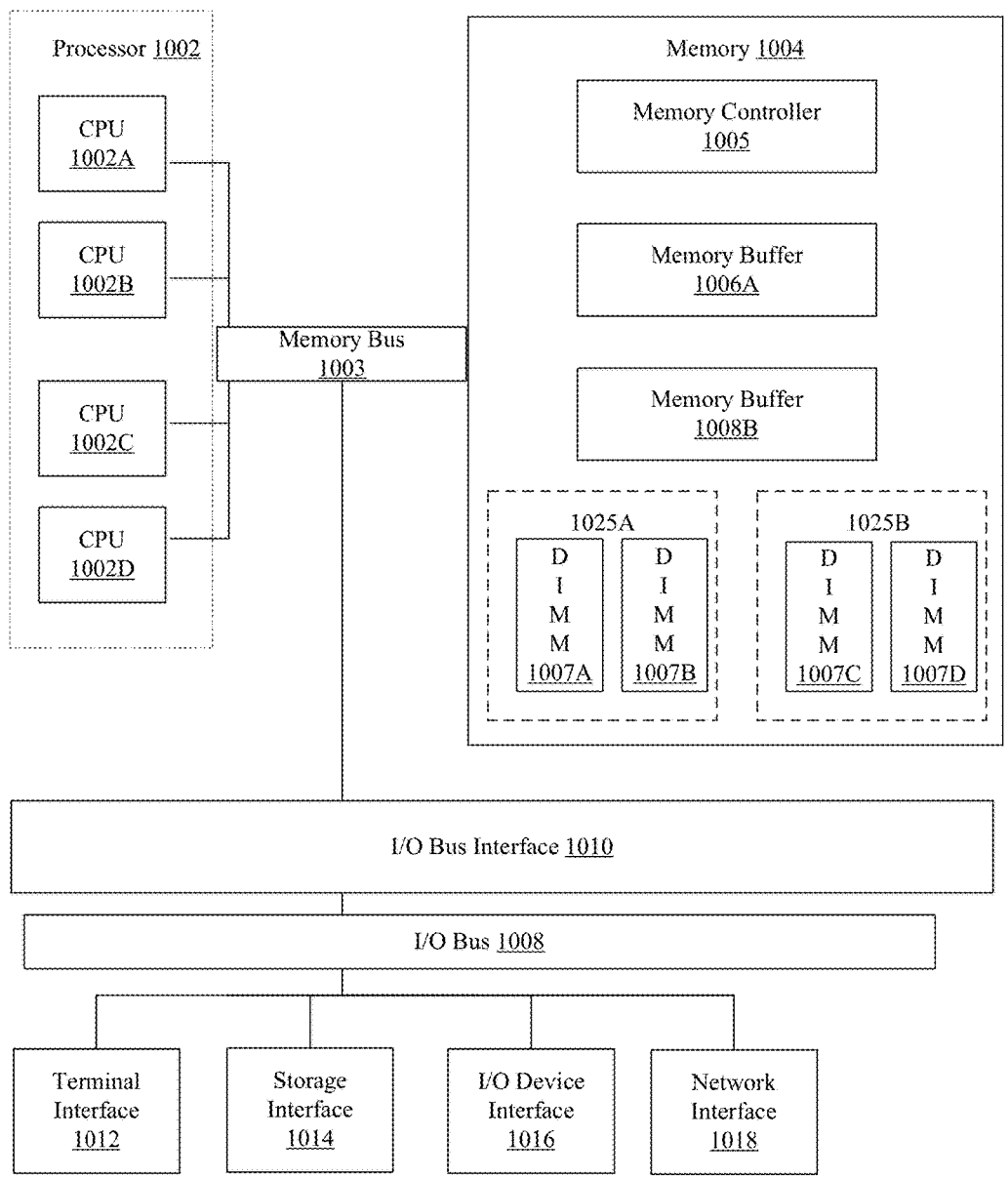
FIG. 10 illustrates a high-level block diagram of an example computer system that may be used in implementing one or more of the methods, tools, and modules, and any related functions, described herein, in accordance with embodiments of the present disclosure.

Referring now to FIG. 10, shown is a high-level block diagram of an example computer system (i.e., computer) 1001 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1001 may comprise one or more CPUs 1002, a memory subsystem 1004, a terminal interface 1012, a storage interface 1014, an I/O (Input/Output) device interface 1016, and a network interface 1018, all of which may be communicatively coupled, directly or indirectly, for inter-component communication via a memory bus 1003, an I/O bus 1008, and an I/O bus interface unit 1010.

The computer system 1001 may contain one or more general-purpose programmable central processing units (CPUs) 1002A, 1002B, 1002C, and 1002D, herein generically referred to as the CPU 1002. In some embodiments, the computer system 1001 may contain multiple processors typical of a relatively large system; however, in other embodiments the computer system 1001 may alternatively be a single CPU system. Each CPU 1002 may execute instructions stored in the memory subsystem 1004 and may comprise one or more levels of on-board cache.

In some embodiments, the memory subsystem 1004 may comprise a random-access semiconductor memory, storage device, or storage medium (either volatile or non-volatile) for storing data and programs. In some embodiments, the memory subsystem 1004 may represent the entire virtual memory of the computer system 1001, and may also include the virtual memory of other computer systems coupled to the computer system 1001 or connected via a network. The memory subsystem 1004 may be conceptually a single monolithic entity, but, in some embodiments, the memory subsystem 1004 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

In some embodiments, the main memory or memory subsystem 1004 may contain elements for control and flow of memory used by the CPU 1002. This may include all or a portion of the following: a memory controller 1005, one or more memory buffers 1006A and 1006B and one or more memory devices 1025A and 1025B. In some embodiments, the memory devices 1025A and 1025B may be dual in-line memory modules (DIMMs), which are a series of dynamic random-access memory (DRAM) chips 1007A-1007D (collectively referred to as 1007) mounted on a printed circuit board and designed for use in personal computers, workstations, and servers. The use of DRAMs 1007 in the illustration is exemplary only and the memory array used may vary in type as previously mentioned.

Although the memory bus 1003 is shown in FIG. 10 as a single bus structure providing a direct communication path among the CPUs 1002, the memory subsystem 1004, and the I/O bus interface 1010, the memory bus 1003 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1010 and the I/O bus 1008 are shown as single respective units, the computer system 1001 may, in some embodiments, contain multiple I/O bus interface units 1010, multiple I/O buses 1008, or both. Further, while multiple I/O interface units are shown, which separate the I/O bus 1008 from various communications paths running to the various I/O devices, in other embodiments some or all of the I/O devices may be connected directly to one or more system I/O buses.

In some embodiments, the computer system 1001 may be a multi-user mainframe computer system, a single-user system, or a server computer or similar device that has little or no direct user interface, but receives requests from other computer systems (clients). Further, in some embodiments, the computer system 1001 may be implemented as a desktop computer, portable computer, laptop or notebook computer, tablet computer, pocket computer, telephone, smart phone, network switches or routers, or any other appropriate type of electronic device.

It is noted that FIG. 10 is intended to depict the representative major components of an exemplary computer system 1001. In some embodiments, however, individual components may have greater or lesser complexity than as represented in FIG. 10, components other than or in addition to those shown in FIG. 10 may be present, and the number, type, and configuration of such components may vary.

As discussed in more detail below, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing a plurality of dashboards configured for monitoring computer servers, the method comprising:
    obtaining, from a first database and by a first application, a first set of data items and a second set of data items, each data item of the first set of data items having at least a first tag and each data item of the second set of data items not having the first tag, wherein the first set of data items are measures of a first computing resource usage metric by corresponding computer servers of a first set of the computer servers, and wherein the second set of data items are measures of the first computing resource usage metric by corresponding computer servers of a second set of the computer servers;
    generating, using the first application, a first data visualization based on the first set of data items and further based on the second set of data items by processing the first set of data items and the second set of data items, wherein the first data visualization is a first graph depicting values generated based on the first computing resource usage metric for both the first set of computer servers and the second set of computer servers;

providing, on a first dashboard of the plurality of dashboards, the first data visualization, wherein the first dashboard includes a first tag selector tool configured to receive a user selection of one or more tags;

obtaining, from a second database and by a second application, a third set of data items and a fourth set of data items, each data item of the third set of data items having at least the first tag and each data item of the fourth set of data items not having the first tag, wherein the third set of data items are measures of a second computing resource usage metric by corresponding computer servers of the first set of the computer servers, and wherein the fourth set of data items are measures of the second computing resource usage metric by corresponding computer servers of the second set of the computer servers;

generating, using the second application, a second data visualization based on the third set of data items and further based on the fourth set of data items by processing the third set of data items and the fourth set of data items, wherein the second data visualization depicts values generated based on the second computing resource usage metric for both the first set of computer servers and the second set of computer servers;

providing, on a second dashboard of the plurality of dashboards, the second data visualization;

receiving a selection of the first tag, wherein the selection of the first tag is made by a user via the first tag selector tool;

filtering out, using the first application and in response to the selection of the first tag, the second set of data items from the first set of data items;

generating, using the first application and subsequent to the filtering out the second set of data items, a third data visualization based on the first set of data items and further not based on the second set of data items by processing the first set of data items, wherein the third data visualization is a second graph depicting values generated based on the first computing resource usage metric for the first set of computer servers;

providing, in response to the selection of the first tag, the third data visualization in place of the first data visualization;

filtering out, using the second application and in response to the selection of the first tag, the fourth set of data items from the third set of data items;

generating, using the second application and subsequent to the filtering out the fourth set of data items, a fourth data visualization based on the third set of data items and further not based on the fourth set of data items by processing the third set of data items, wherein the fourth data visualization depicts values generated based on the second computing resource usage metric for the first set of computer servers; and providing, in response to the selection of the first tag, the fourth data visualization in place of the second data visualization, wherein a dashboard connector module that is not part of the first application or the second application serves as a link between the first application and the second application to enable two-way synchronization of tag selections between them, and wherein the method further comprises:

notifying, using the first application and in response to the selection of the first tag, the dashboard connection module of the selection of the first tag; and pushing, by the dashboard connection module, the notification of the selection of the first tag to the second application, wherein the filtering out, using the second application, the fourth set of data items from the third set of data items is responsive to the pushed notification.

2. The method of claim 1, wherein the first dashboard is part of the first application and the second dashboard is part of the second application.

3. The method of claim 1, wherein the providing the first data visualization includes displaying the first data visualization to a user, wherein the providing the second data visualization includes displaying the second data visualization to the user, wherein the selection of the first tag is a selection by the user, wherein the providing the third data visualization includes displaying the third data visualization to the user, and wherein the providing the fourth data visualization includes displaying the fourth data visualization to the user.

4. The method of claim 1 further comprising:

obtaining, subsequent to the providing the third data visualization, a first data update to the first set of data items, wherein the first data update is obtained from a first set of remote data sensors;

obtaining, subsequent to the providing the fourth data visualization, a second data update to the third set of data items, wherein the second data update is obtained from a second set of remote data sensors;

updating, based the first data update, the third data visualization; and updating, based on the second data update, the fourth data visualization, wherein the obtaining the first data update, obtaining the second data update, updating the third data visualization, and updating the fourth data visualization all occur without further user interaction after the selection of the first tag.

5. The method of claim 1 further comprising:

obtaining dynamic updates to at least a portion of each of the first set of data items, the second set of data items, the third set of data items, and the fourth set of data items; and continuously updating, in response to the obtaining the dynamic updates, the first dashboard and the second dashboard.

6. The method of claim 1, wherein the second dashboard includes a second tag selector tool configured to receive the user selection of one or more tags, wherein the first set of data items includes a first subset of data items and a second subset of data items, each data item of the first subset of data items having the first tag and further having a second tag and each data item of the second subset of data items having the first tag and further not having the second tag, and wherein the third set of data items includes a third subset of data items and a fourth subset of data items, each data item of the third subset of data items having the first tag and further having the second tag and each data item of the fourth subset of data items having the first tag and further not having the second tag, the method further comprising:

receiving a second selection of the first tag and the second tag, wherein the second selection of the first tag and the second tag is made by a user via the second tag selector tool and not the first tag selector tool;

providing, in response to the second selection of the first tag and the second tag, a fifth data visualization in place of the third data visualization, the fifth data visualization based on the first subset of data items and further not based on the second subset of data items; and providing, in response to the second selection of the first tag and the second tag, a sixth data visualization in place of the fourth data visualization, the sixth data visualization based on the third subset of data items and further not based on the fourth subset of data items.

* * * * *